Sept. 23, 1958     C. G. DEUBEL     2,853,134
MANUFACTURE OF STEEL RULE DIES
Filed July 5, 1955
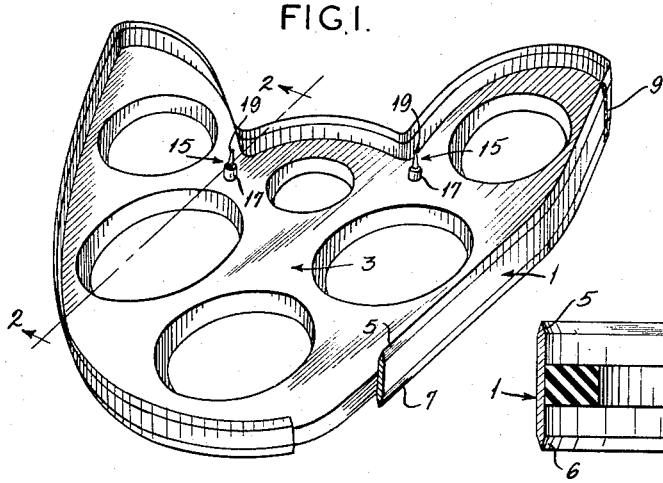
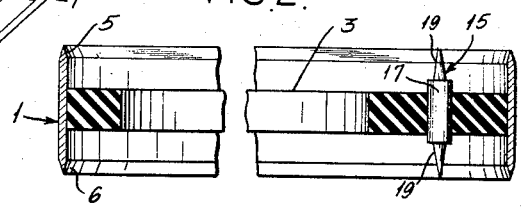
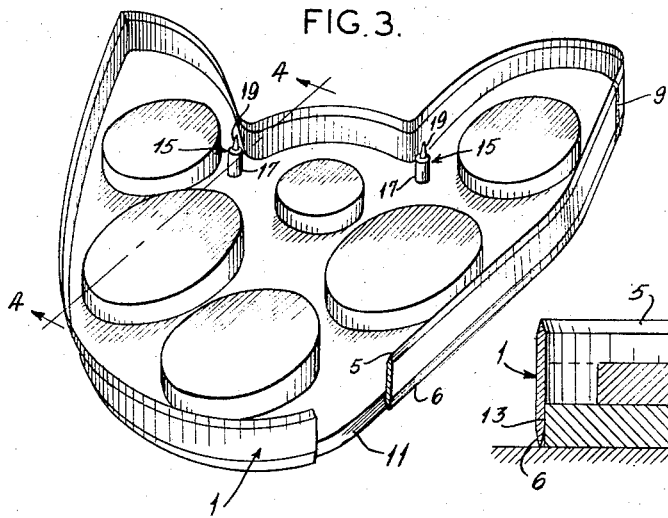
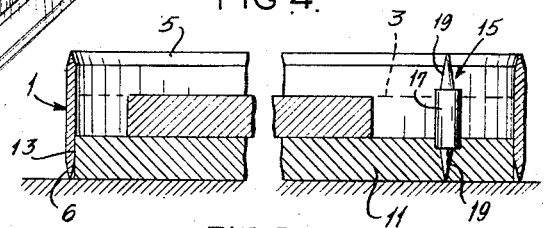
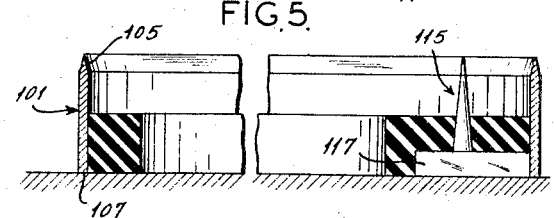
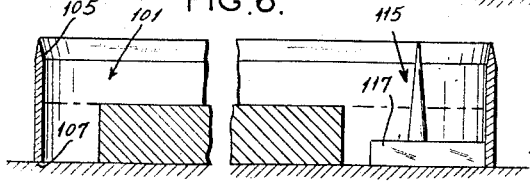
INVENTOR
CARL GEORGE DEUBEL
By Bruninga and Sutherland,
ATTORNEYS.

United States Patent Office 2,853,134
Patented Sept. 23, 1958

2,853,134

MANUFACTURE OF STEEL RULE DIES

Carl George Deubel, Harrisburg, Pa., assignor to Progressive Service Company, St. Louis, Mo., a corporation of Missouri Application July 5, 1955, Serial No. 519,779

4 Claims. (Cl. 164—29)

This invention relates to the manufacture of steel rule dies for cutting sheet material.

In cutting pieces of special outline from leather and the like, it is common practice to employ a steel rule die. A piece of thin steel strip having a knife edge is bent to the outline of the piece to be cut. In most instances, the ends of the strip are secured together to form a closed loop, which is internally reinforced.

Various reinforcing systems have been proposed. For example, rigid braces are cut to bridge the loop and are then welded to the strip, but considerable labor is required in fabricating and attaching such braces. In other instances, the steel strip is provided with flanges or beads extending longitudinally along one or both sides. The flanges may be riveted, to a reinforcing plate cut in the outline of the die, or the beads may define a groove for receiving the margin of such a reinforcing plate. A disadvantage with this procedure, however, is that the flanges and beads add to the expense of the steel strip, and it is still necessary to rivet, weld or otherwise secure the strip to the inner reinforcing member. Also, a plate-like reinforcing element tends to obscure the vision of a die cutter, it being understood that in cutting shoe parts from a hide, the operator must position the die so as to make efficient use of the hide while avoiding blemishes. Another difficulty experienced with this type of die is that of attaching "stabs," which are small pointed members spaced inwardly from the knife edges.

Accordingly, it is an object of the invention to provide an improved steel rule die and method of manufacture. Among the more specific objects of the invention may be noted the provision of a steel rule die having an inner reinforcement that is readily formed to proper shape and secured to the steel strip; the provision of a die of the class described wherein "stabs" and the like are quickly and conveniently secured at any point within the outline of the die; the provision of a die of the character referred to having inner reinforcement that does not obscure view of sheet material to be cut thereby; and the provision of a method of making such dies which is both fast and convenient.

Briefly, these objectives are achieved by first bending the steel strip to desired outline, as by forming the strip about a pattern. The ends of the strip are joined together, as by welding, and are ground to a smooth surface, according to conventional practice. Some dies are formed with double cutting edges and others use only a single cutting edge. In the latter case, the pattern is removed and the strip is placed upon a smooth horizontal surface, so as to rest upon the dull edge. A casting or potting plastic, such as one of the epoxy resins, is then poured into the cavity defined by the supporting surface and the closed loop of steel strip. The amount of plastic is such that the upper surface thereof is substantially below the upwardly facing sharp edge, and the plastic should be a clear transparent material that bonds well with the steel strip.

Core blocks may be placed upon the supporting surface within the closed loop and in spaced relationship therefrom so as to reduce the amount of plastic required, especially in large dies. Also, the "stabs" or similar elements are placed upon the supporting surface in proper position prior to the pouring of the casting plastic. Preferably, such small elements as "stabs" are first provided with a head of substantially large area so that they will be more firmly secured. Although the above process relates to a single edge die, a double edge can also be made by leaving the pattern within the die so that the lower surface as well as the upper surface of the solidifying plastic will be spaced from the cutting edges.

Other features of the invention will be in part apparent from and in part pointed out in the following detail description taken in connection with the accompanying drawings, in which:

Fig. 1 is a perspective view of a die manufactured according to this invention, parts being broken away;

Fig. 2 is a section taken on the line 2—2 of Fig. 1;

Fig. 3 is a view similar to that of Fig. 1 but showing a preliminary step in the manufacture of the die;

Fig. 4 is a section taken on the line 4—4 of Figure 3;

Fig. 5 is a view similar to that of Fig. 2, but showing another type of die; and Fig. 6 is a view similar to that of Fig. 4 but illustrating the method employed in making the die of Fig. 5.

It will be understood that steel rule dies are customarily made from a steel strip, one or both edges of which may be sharpened. For example, the strip might be three-fourths of an inch in width and about one-sixteenth of an inch thick. The cutting dies are usually formed as closed loops of varying shape, a die used in cutting the front or vamp portion of a shoe being somewhat in the outline of a butterfly. This type of die is then used on a machine having a flat bed over which the work may be moved, the die being placed upon the leather in proper position. A ram having a flat lower surface is brought down against the upper edges of the die to cut a piece from the leather or other work material.

The forces applied against the die are substantial, however, and the vertical strips might be deformed unless some sort of inner reinforcement is provided. In the past, various reinforcing systems have been utilized, but these systems are not entirely satisfactory in that they complicate the manufacturing process, increase cost, and obscure view through the center of the die.

Referring now to the drawings, Fig. 1 illustrates a steel rule die made according to this invention. As in conventional dies of this type, a steel strip 1 is shaped to the proper outline of the piece to be cut, and an inner reinforcement 3 is provided to strengthen the strip 1. Figs. 1–4 illustrate a die wherein the steel strip is ground or sharpened along both edges 5 and 7, and the reinforcement 3 is set back from both edges so that the die is reversible. The difference over conventional practice resides in the character of the reinforcement and the process of making the die.

In accordance with the invention, the steel strip 1 may be bent to the desired shape about a pattern 11. The ends of the strip are brought together and are secured, as by welding 9, which is ground off smoothly. The pattern may then be reinserted but should be of a thickness substantially less than the width of the strip 1, a thickness approximately one-third of the strip width being satisfactory. Where the inner portion of the strip is beveled to form the cutting edges, the pattern preferably is of a thickness slightly greater than the depth of the bevel, as indicated at 13 in Fig. 4.

The formed strip is then placed upon a table and the pattern pressed down so that only the bottom third of the space defined by the loop is filled with the pattern 11. The potting or casting plastic is then poured into the space defined by the upper surface of the pattern and the inner perimeter of the die, the resin being poured to a depth sufficient to fill the middle third of this space. Resins suitable for this purpose will be known to those skilled in the art, and no claim is made to the use of any specific resin. The characteristics should include good adhesion to the steel strip, high strength, and relatively small shrinkage or a coefficient of expansion approximately that of the steel strip. The epoxy or ethoxylene resins (such as Araldite #502 of Ciba Co., Inc.) are especially satisfactory for this purpose. In using epoxy resin, the curing process is greatly accelerated by a heating temperature of about 200° F. for about twenty minutes with slight variations, depending upon the thickness of the plastic.

After being cured, the pattern may be removed so that the center portion of the die is filled only with the cured resin. The resin will normally have a tight adhesion with the steel strip, and it should be relatively clear or transparent, in order that the work material may be readily viewed. For this reason, the upper face of the pattern or the surface upon which the plastic is poured should be smooth and preferably polished. Otherwise, visibility through the die may be improved by punching holes through the resin or by placing removable plugs upon the pattern before pouring the resin, the plugs being subsequently removed. The plugs and pattern would be covered with a releasing compound so that the resin will not adhere thereto, but these techniques are known in the art.

In those cases where stabs 15 are to be provided, they are secured in the pouring surface or pattern before the resin is poured. Figs. 1-4 illustrate a stab formed with a central cylindric portion 17, which is imbedded within the resin and pointed portions 19 projecting from opposite sides of this central support. Normally, the stabs will be securely held by adhesion with the cured resin. From the above, it will be apparent that a steel rule die can be quickly and conveniently manufactured using a low cost steel rule die stock 1, without the complications of a custombuilt reinforcement made up from welded braces.

It should be understood, however, that the invention can be practiced in making other types of die. For example, Figs. 5 and 6 illustrate a die wherein only one of the edges 105 is ground or sharpened. In this case, the dull edge 107 is laid upon the table and the plastic may be poured to a depth sufficient to fill the bottom half of the space defined by the steel strip 101. Also, the stabs 115 in this embodiment differ slightly in that they are affixed to steel base plugs or plates 117. The plugs may be set at any proper position upon the pouring surface prior to pouring of the resin, and also provide a firmer attachment with the resin core.

From the foregoing description, it is apparent that those skilled in the art will understand the structure, function and mode of operation of the invention herein disclosed, and appreciate the advantages thereof. Although several embodiments have been disclosed in detail, it is to be understood that the invention is not limited thereto, but the drawings and description thereof are to be understood as being merely illustrative. It is realized that many modifications and variations will present themselves to those skilled in the art without departing from the spirit of this invention or the scope thereof as set forth in the appended claims.

Having thus described the invention, what is claimed and desired to be secured by Letters Patent is:

1. A steel rule die comprising a steel strip with at least one or more edges thereof sharpened, the strip being formed into a closed loop, and a cast inner reinforcement of transparent resin self adhered to substantially the entire inner perimeter of the steel strip and extending at least in part across the loop, one face of the resin being set back from the sharpened edge of the steel strip and said reinforcement being entirely transparent.

2. A die as set forth in claim 1, further including stabs imbedded in the inner resin reinforcement to project therefrom on the face thereof adjacent the sharpened edge of the steel strip.

3. A die as set forth in claim 2, wherein the stabs have relatively enlarged bases imbedded within the inner reinforcement.

4. A die as set forth in claim 1, wherein both edges of the steel strip are sharpened, the central reinforcement being set back from both edges of the steel strip.

References Cited in the file of this patent

UNITED STATES PATENTS

| Number | Name | Date |
| --- | --- | --- |
| 35,874 | Graves | July 15, 1862 |
| 2,178,473 | Exley | Oct. 31, 1939 |
| 2,298,041 | Dedrick | Oct. 6, 1942 |
| 2,300,526 | Ryan | Nov. 3, 1942 |
| 2,363,306 | Fiske | Nov. 21, 1944 |
| 2,571,397 | Wells | Oct. 16, 1951 |
| 2,708,773 | Bacon | May 24, 1955 |

FOREIGN PATENTS

| Number | Country | Date |
| --- | --- | --- |
| 663,799 | Great Britain | Dec. 27, 1951 |
| 761,018 | France | Mar. 8, 1934 |